U S010652104B1

United States Patent
Munn et al.

(10) Patent No.: US 10,652,104 B1
(45) Date of Patent: May 12, 2020

(54) SYSTEM FOR INFERRING NETWORK DYNAMICS AND SOURCES WITHIN THE NETWORK

(71) Applicant: HRL Laboratories, LLC, Malibu, CA (US)

(72) Inventors: Steven J. Munn, Isla Vista, CA (US); Kang-Yu Ni, Calabasas, CA (US); Jiejun Xu, Chino, CA (US)

(73) Assignee: HRL Laboratories, LLC, Malibu, CA (US)

(*) Notice: Subject to any disclaimer, the term of this patent is extended or adjusted under 35 U.S.C. 154(b) by 100 days.

(21) Appl. No.: 15/782,668

(22) Filed: Oct. 12, 2017

Related U.S. Application Data

(60) Provisional application No. 62/444,381, filed on Jan. 10, 2017, provisional application No. 62/407,358, filed on Oct. 12, 2016.

(51) Int. Cl.
  G06F 15/173 (2006.01)
  H04L 12/24 (2006.01)
  H04L 12/26 (2006.01)
  G06F 17/16 (2006.01)
  G06F 9/50 (2006.01)

(52) U.S. Cl.
  CPC .............. *H04L 41/16* (2013.01); *G06F 17/16* (2013.01); *H04L 41/046* (2013.01); *H04L 41/0893* (2013.01); *H04L 43/065* (2013.01); *G06F 9/5077* (2013.01)

(58) Field of Classification Search
  CPC .............................. H04L 41/16; H04L 43/065
  See application file for complete search history.

(56) References Cited

U.S. PATENT DOCUMENTS 8,713,096 B2 * 4/2014 Lin .......................... G06F 8/60
  709/203
9,183,571 B2 * 11/2015 Kansal .................. G06Q 30/02
(Continued)

OTHER PUBLICATIONS

R. R. Coifman and M. Maggioni. Diffusion wavelets. Applied and Computational Harmonic Analysis, 21(1): pp. 53-94, 2006.
(Continued)

*Primary Examiner* — Hua Fan
(74) *Attorney, Agent, or Firm* — Tope-McKay & Associates

(57) ABSTRACT

Described is a system for inferring network dynamics and their sources within the network. During operation, a vector representation is generated based on states of agents in a network. The vector representation including attribute vectors that correspond to the states of the agents in the network. A matrix representation is then generated based on the changing states of agents by packing the attribute vectors at each time step into an attribute matrix. Time-evolving states of the agents are learned using dictionary learning. Influential source agents in the network are then identified by performing dimensionality reduction on the attribute matrix. Finally, in some aspects, an action is executed based on the identity of the influential source agents. For example, marketing material may be directed to a source agent's online account, or the source agent's online account can be deactivated or terminated or some other desired action can be taken.

23 Claims, 7 Drawing Sheets

(56) References Cited

U.S. PATENT DOCUMENTS

| | | | | |
|---|---|---|---|---|
| 2012/0254102 | A1* | 10/2012 | Li | G06Q 10/10 |
| | | | | 706/58 |
| 2012/0311030 | A1* | 12/2012 | Lin | G06F 15/16 |
| | | | | 709/204 |
| 2014/0348309 | A1* | 11/2014 | Davis | H04M 3/4878 |
| | | | | 379/88.12 |
| 2016/0248847 | A1* | 8/2016 | Saxena | H04L 67/18 |
| 2016/0275416 | A1* | 9/2016 | Min | G05B 13/04 |
| 2017/0206249 | A1* | 7/2017 | Pitirimov | H04L 51/32 |
| 2017/0279833 | A1* | 9/2017 | Vasseur | H04L 63/1425 |

OTHER PUBLICATIONS

M. Crovella and E. Kolaczyk. Graph wavelets for spatial traffic analysis. In INFOCOM 2003. Twenty-Second Annual Joint Conference of the IEEE Computer and Communications. IEEE Societies, vol. 3, pp. 1848-1857. IEEE, 2003.

P. Domingos and M. Richardson. Mining the network value of customers. In Proceedings of the seventh ACM SIGKDD International conference on Knowledge discovery and data mining, pp. 57-66. ACM, 2001.

L. J. Grady and J. Polimeni. Discrete calculus: Applied analysis on graphs for computational science. Springer Science & Business Media, 2010, pp. 155-197.

D. K. Hammond, P. Vandergheynst, and R. Gribonval. Wavelets on graphs via spectral graph theory. Applied and Computational Harmonic Analysis, 30(2): pp. 129-150, 2011.

P. O. Hoyer. Non-negative matrix factorization with sparseness constraints. Journal of machine learning research, 5 (Nov): pp. 1457-1469, 2004.

C.-J. Lin. Projected gradient methods for nonnegative matrix factorization. Neural computation, 19(10): pp. 2756-2779, 2007.

J. Mairal, F. Bach, J. Ponce, and G. Sapiro. Online dictionary learning for sparse coding. In Proceedings of the 26th annual international conference on machine learning, pp. 689-696. ACM, 2009.

M. Richardson and P. Domingos. Mining knowledge-sharing sites for viral marketing. In Proceedings of the eighth ACM SIGKDD international conference on Knowledge discovery and data mining, pp. 61-70. ACM, 2002.

A. Sandryhaila and J. M. Moura. Discrete signal processing on graphs. IEEE transactions on signal processing, 61(7): pp. 1644-1656, 2013.

J. Shi and J. Malik. Normalized cuts and image segmentation. IEEE Transactions on pattern analysis and machine intelligence, 22(8): pp. 888-905, 2000.

I. Tosic and P. Frossard. Dictionary learning. IEEE Signal Processing Magazine, 28(2): pp. 27-38, 2011.

* cited by examiner

Accuracy

| Simulation model | Exact node | Within one hop |
|---|---|---|
| Threshold | 30 % | 100 % |
| Decaying cascade | 50 % | 80 % |

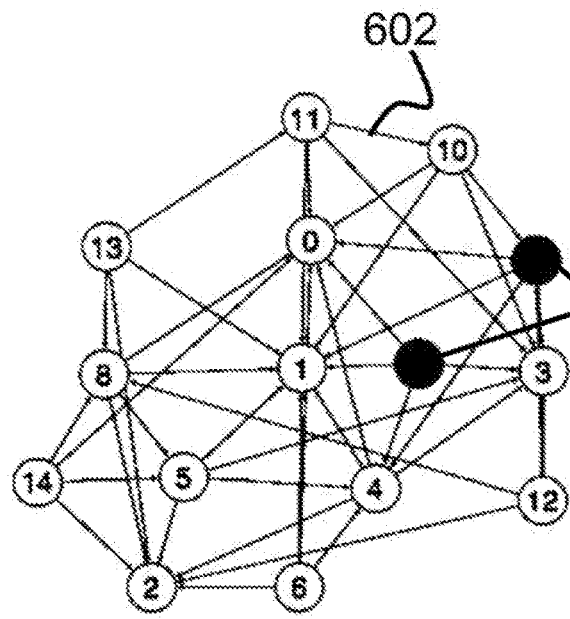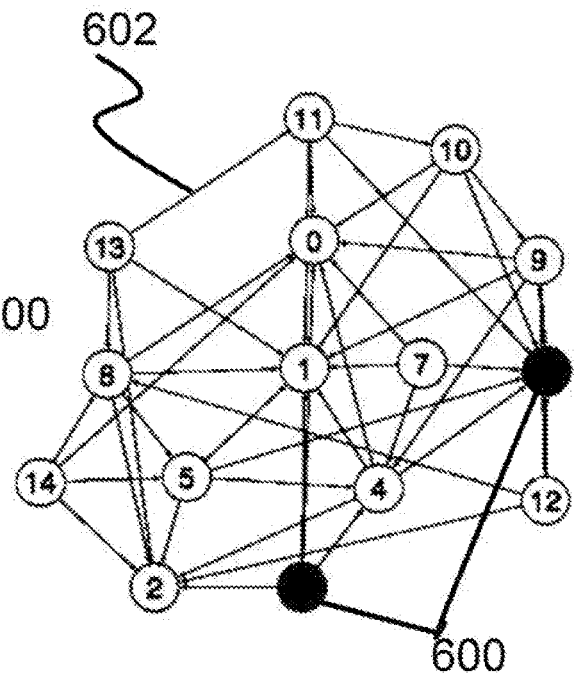
FIG. 6A  FIG. 6B
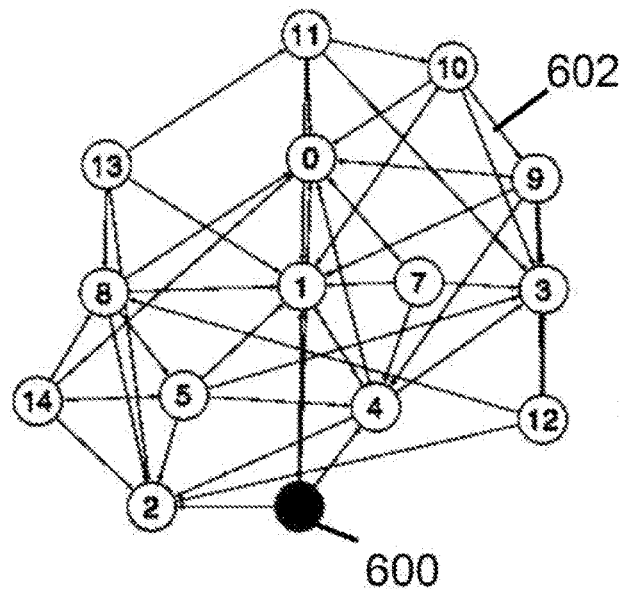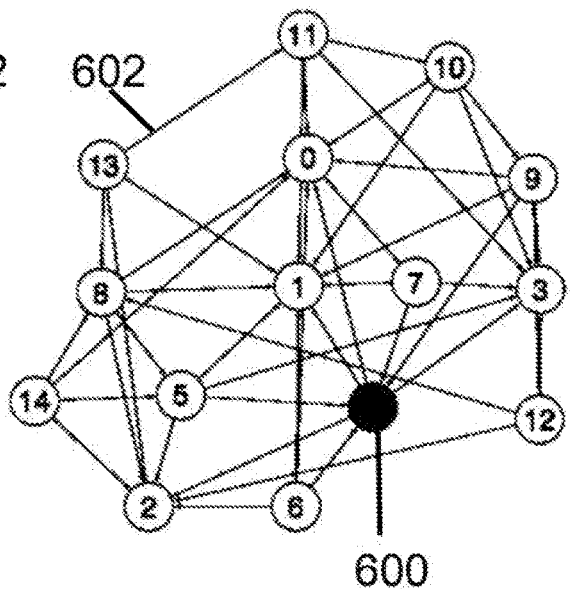
FIG. 6C  FIG. 6D

| Rank | Description |
| --- | --- |
| 1 | Video collection features slapstick humor |
| 2 | Fashion and film |
| 3 | Humorous video collection with a voting system |
| 4 | Absurd-type humorous posts |
| 5 | Cartoon animation enthusiast's blog |
| 6 | Self-proclaimed novelist's posts |

FIG. 7

SYSTEM FOR INFERRING NETWORK DYNAMICS AND SOURCES WITHIN THE NETWORK

CROSS-REFERENCE TO RELATED APPLICATIONS

This application claims the benefit of and is a non-provisional patent application of U.S. Provisional Application No. 62/444,381, filed on Jan. 10, 2017, the entirety of which is hereby incorporated by reference.

This application also claims the benefit of and is ALSO a non-provisional patent application of U.S. Provisional Application No. 62/407,358, filed on Oct. 12, 2016, the entirety of which is hereby incorporated by reference.

BACKGROUND OF INVENTION

(1) Field of Invention

The present invention relates to a network analysis system and, more specifically, to system for inferring network dynamics and their sources.

(2) Description of Related Art

In reviewing networks and network dynamics, it is desirable to be able to understand how opinions or other dynamics influence the network. Influence maximization is the task of finding the key users, or groups, in an interaction network who can most effectively spread ideas and opinions to others. Solving the influence maximization problem typically depends on having a good model, or making the proper assumptions, for the opinion dynamics. The influence maximization problem arguably came to fame with the advent of viral marketing —especially with the work of Domingos and Richardson (see the List of Incorporated Literature References, Literature Reference Nos. 3 and 9). These authors devised several models for spreading information on a network and set out to find algorithms that trace back the sources of information based on a time-series of observations.

In other work, graphs are often used to represent networks or processes. The area of signal processing on graphs attempts to better represent and understand dynamic processes by using signal processing transforms adapted to the graph domain. Perhaps the most well-known transform for graphs, the graph Fourier transform (GFT), expands attribute vectors as a linear combination of the graph Laplacian eigenvectors (see Literature Reference No. 4). There are several ways of understanding these GFT basis functions. For example, if the graph under study represents a spring and mass system, where the nodes are masses and edges are springs, the Laplacian eigenvectors can be thought of as oscillation modes obtained by shaking a node on the graph (see Literature Reference No. 11). The GFT assumes, however, that the graph attributes are smooth with respect to the network structure (see Literature Reference No. 4), which is often not the case with real-world dynamics.

Another approach is to design wavelet transforms that better reflect the processes underlying the graph attributes (see, for example, Literature Reference Nos. 1, 2, and 5). This works well for some specific cases; however, there is often only a superficial understanding of the processes unfolding on networks, which makes wavelets difficult to design or apply in general.

Although previous work on modeling dynamics exists, all of them use linear and non-linear systems theory as their primary tool, each of which suffer from setbacks. Thus, a continuing need exists for a system for inferring network dynamics and their sources using a unique combination of ideas from signal processing, dictionary learning, and graph theory.

SUMMARY OF INVENTION

Described is a system for inferring network dynamics and their sources within the network. In various embodiments, the system includes one or more processors and a memory. The memory is a non-transitory computer-readable medium having executable instructions encoded thereon, such that upon execution of the instructions, the one or more processors perform several operations. For example, during operation, a vector representation is generated based on states of agents in a network. The vector representation including attribute vectors that correspond to the states of the agents in the network. A matrix representation or attribute matrix is then generated based on the changing states of agents by packing the attribute vectors at each time step into the attribute matrix. Time-evolving states of the agents are learned using dictionary learning. Influential source agents in the network are then identified by performing dimensionality reduction on the attribute matrix. Finally, in some aspects, an action is executed based on the source agents. For example, a source agent's online account could be terminated, etc.

In another aspect, in generating a vector representation based on the states of agents in a network, the network includes nodes and edges connecting the nodes, the nodes representative of agents in the network and the edges representative of actions by the agents in the network.

Further, if the attributes at a given node are a time series, attribute vectors at each time step can be packed into a matrix of attributes X that is N by t dimensional, where t is the number of time steps in a signal.

Additionally, the changing states of agents is based on a time-series of each agent.

In another aspect, learning time-evolving states of agents using dictionary learning is performed through non-negative matrix factorization (NMF).

In yet another aspect, learning the time-evolving states of agents using dictionary learning is performed on the attribute matrix.

In another aspect, learning the time-evolving states of agents using dictionary learning is performed in parallel on submatrices of the attribute matrix.

In yet another aspect, the system performs an operation of acquiring data from a social network server that includes states of agents in a network.

In other aspects, executing an action further comprises an operation of directing marketing information to be displayed on a social media account associated with the influential source agents.

In other aspects, executing an action further comprises an operation of providing the identity of the influential source agents via a display.

In other aspects, executing an action further comprises an operation of deactivating a social media account associated with the influential source agents.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 6A is an illustration depicting atoms spreading in a threshold model;

FIG. 6B is an illustration depicting atoms spreading in a threshold model;

FIG. 6C is an illustration depicting atoms spreading in a cascade model;

FIG. 6D is an illustration depicting atoms spreading in a cascade model; and

FIG. 7 is a table illustrating example ranking results.

DETAILED DESCRIPTION

Figure 1:
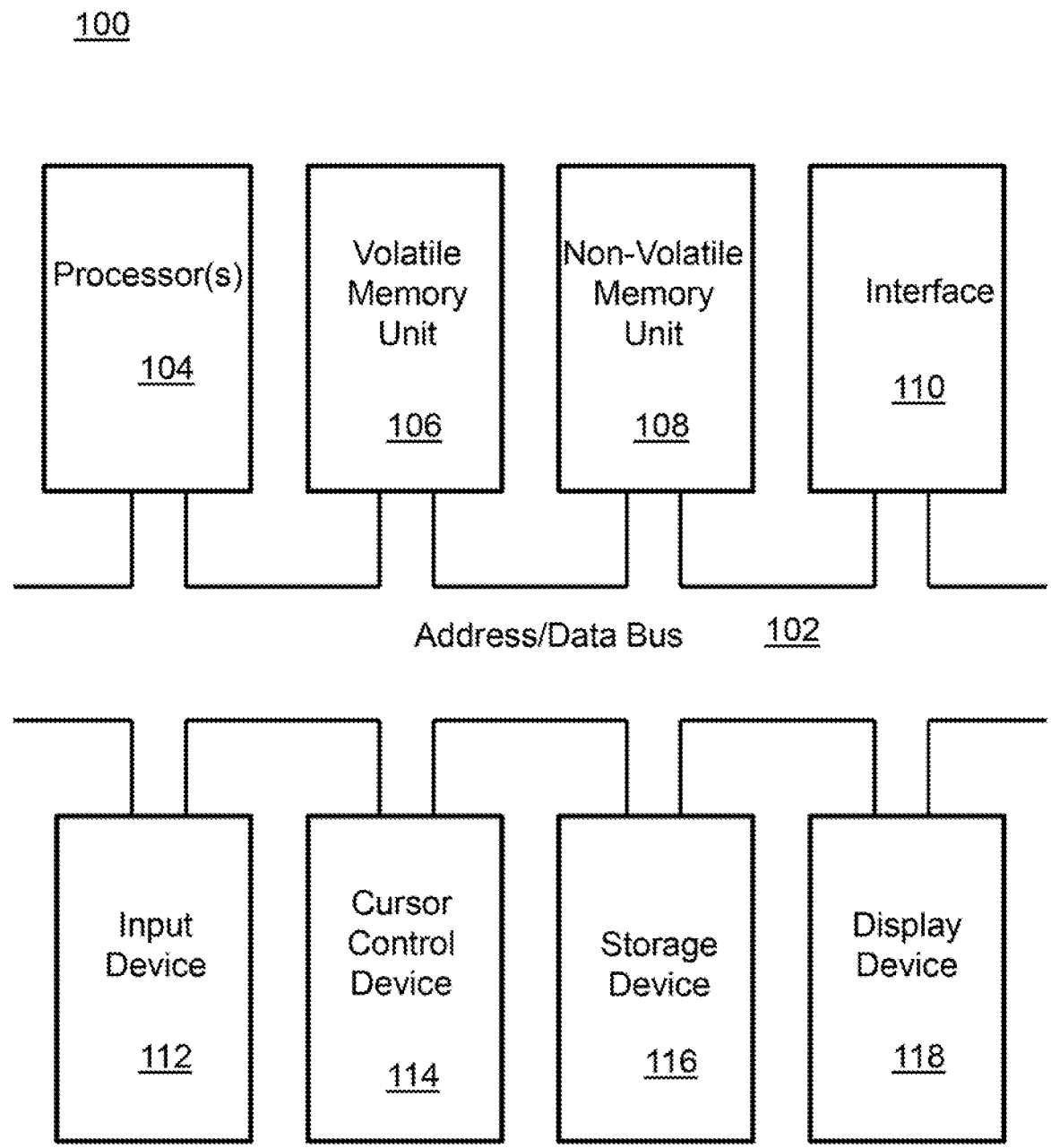
FIG. 1 is a block diagram depicting the components of a system according to various embodiments of the present invention.

The present invention relates to a network analysis system and, more specifically, to system for inferring network dynamics and their sources. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. R. R. Coifman and M. Maggioni. Diffusion wavelets. Applied and Computational Harmonic Analysis, 21(1): 53-94, 2006.
2. M. Crovella and E. Kolaczyk. Graph wavelets for spatial traffic analysis. In INFOCOM 2003. Twenty-Second Annual Joint Conference of the IEEE Computer and Communications. IEEE Societies, volume 3, pages 1848-1857. IEEE, 2003.
3. P. Domingos and M. Richardson. Mining the network value of customers. In Proceedings of the seventh ACM SIGKDD international conference on Knowledge discovery and data mining, pages 57-66. ACM, 2001.
4. L. J. Grady and J. Polimeni. Discrete calculus: Applied analysis on graphs for computational science. Springer Science & Business Media, 2010.
5. D. K. Hammond, P. Vandergheynst, and R. Gribonval. Wavelets on graphs via spectral graph theory. Applied and Computational Harmonic Analysis, 30(2):129-150, 2011.
6. P. O. Hoyer. Non-negative matrix factorization with sparseness constraints. Journal of machine learning research, 5 (November):1457-1469, 2004.
7. C.-J. Lin. Projected gradient methods for nonnegative matrix factorization. Neural computation, 19(10):2756-2779, 2007.
8. J. Mairal, F. Bach, J. Ponce, and G. Sapiro. Online dictionary learning for sparse coding. In Proceedings of the 26th annual international conference on machine learning, pages 689-696. ACM, 2009.
9. M. Richardson and P. Domingos. Mining knowledge-sharing sites for viral marketing. In Proceedings of the eighth ACM SIGKDD international conference on Knowledge discovery and data mining, pages 61-70. ACM, 2002.
10. A. Sandryhaila and J. M. Moura. Discrete signal processing on graphs. IEEE transactions on signal processing, 61(7):1644-1656, 2013.
11. J. Shi and J. Malik. Normalized cuts and image segmentation. IEEE Transactions on pattern analysis and machine intelligence, 22(8):888-905, 2000.

12. I. Tosic and P. Frossard. Dictionary learning. IEEE Signal Processing Magazine, 28(2):27-38, 2011.

(2) PRINCIPAL ASPECTS

Various embodiments of the invention include three "principal" aspects. The first is a system for inferring network dynamics and their sources. The system is typically in the form of a computer system operating software or in the form of a "hard-coded" instruction set. This system may be incorporated into a wide variety of devices that provide different functionalities. In some aspects, the system may interface with one or more online social network platforms to obtain user data and possibly initiate actions based on identifying sources of the various network dynamics. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
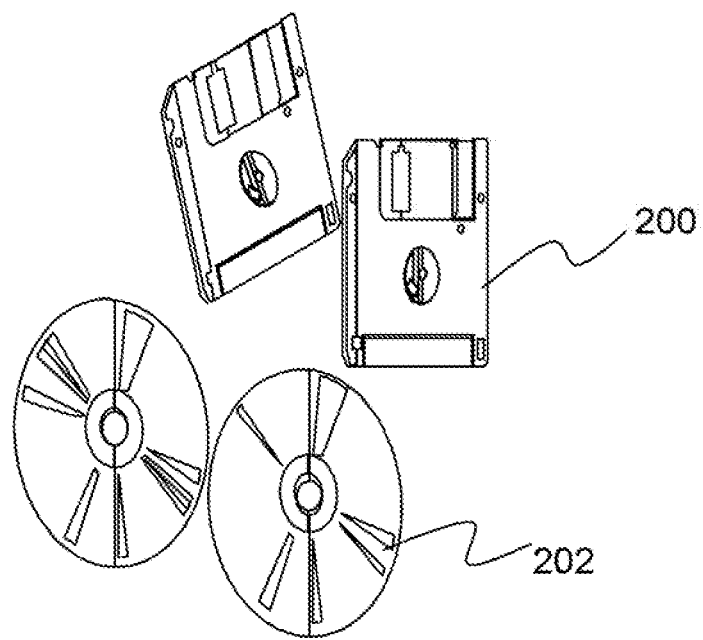
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

This disclosure provides a new way to understand dynamic processes on networks and a different way to pinpoint sources of change on the network. This unique approach involves representing the time-series of states (i.e., time-evolving states) of nodes in a network as graph-attributes, which are compiled into a signal matrix. Non-negative matrix factorization (NMF) is performed on the signal matrix to obtain either a lower-dimensional representation of the attributes or a sparse representation thereof. For the latter, NMF shows the ways in which the states change over time (changing states). For the former, NMF provides a succinct understanding of the typical state distributions, which is helpful for finding the sources of network dynamics.

A key difference between some embodiments of this disclosure and conventional approaches is that no assumptions are made about the processes by which changes occur on a network. In addition, this disclosure offers a new way of studying these processes to better understand them, and devise better models for them.

In relation to network dynamic processes, previously existing techniques fall into the following two categories: Models for network dynamics, and algorithms for tracing back the sources of change in pre-existing models. The method of this disclosure can trace these sources without making any assumptions about the different processes that underlie the dynamics on the network. In addition, for problems such as traffic analysis or information spreading, accurate models are often of such computational complexity that algorithms for backtracking the sources are unfeasible. The method of this disclosure finds these sources, given enough observations from the network when no other method can.

There are several applications for the system described herein. For example, the system can be used in commercial applications such as marketing campaigns and personalized incentive services. It can also be used to identify mobility patterns from large-scale vehicle logs. Or in other aspects, can be used for situational awareness using social network and publicly available online data. Other uses include providing early warnings (e.g., illuminating lights on a dashboard, notifying authorities, etc.) based on analysis and summary of aircraft sensor data.

(4) SPECIFIC DETAILS OF VARIOUS EMBODIMENTS

Figure 3:
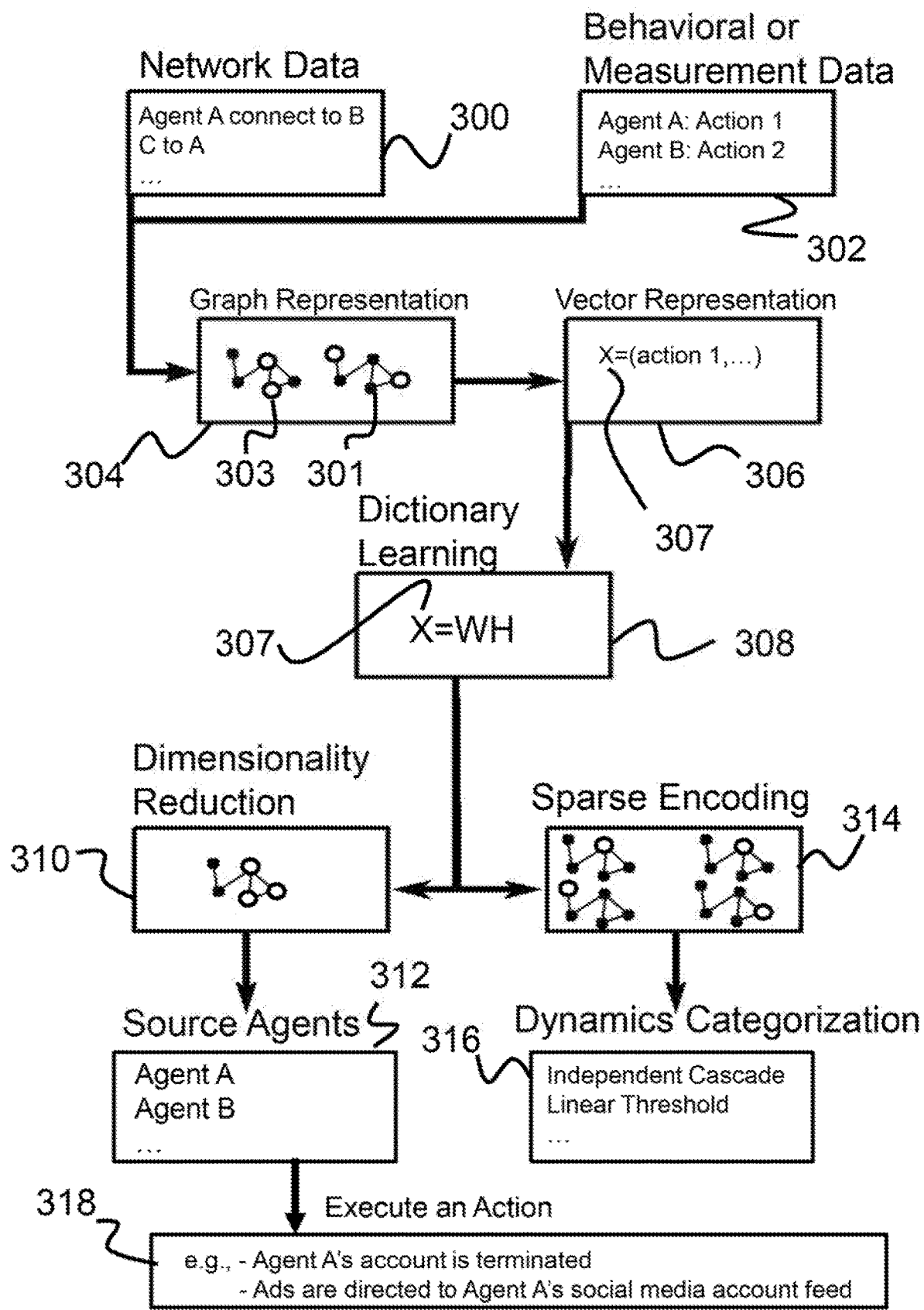
FIG. 3 is a flowchart illustrating the process flor for inferring network dynamics according to various embodiments of the present invention.

As noted above, described is a system that provides a new way to understand dynamic processes on networks and a different way to pinpoint sources of change on the network. Specific details are provided below. The general steps of the system are illustrated in FIG. 3. Specifically, FIG. 3 depicts that in some embodiments, the system receives both network data 300 and behavioral or measurement data 302. The network data includes connections between various nodes (e.g., users or agents, system components, user accounts, etc.) in a network, while the behavioral or measurement data 302 includes various actions (e.g., users' activities, for example, a Tumblr user reblogs a post) or measurements (e.g., sensor readings, etc.) regarding each node. The network data 300 and behavioral or measurement data 302 is combined into a graph representation 304 by nodes, connections (edges), and states of nodes (e.g., filled nodes 301 indicate inactive while unfilled nodes 303 represent active) which is used for further processing. The graph representation 304 is converted into a vector representation 306 during setup. As shown, X is an attribute matrix 307 in which each column is an attribute vector that describes the state of each node at a time stamp. The attribute matrix X 307 consists of attribute vectors for all time stamps, which allows the system to proceed with dictionary learning 308 through non-negative matrix factorization (NMF). Based on results of the dictionary learning process 308, dimensionality reduction 310 can be performed on the resulting time-series to identify the influential users or source agents 312. The identity of the influential source agent is any suitable identifier that can be used to identify a particular agent. For example, the identity can simply be a particular user account name or handle, or an actual user's name (e.g., based on the user's postings or based on cross-checking with a user database). In some embodiments, the source agents 312 are the initially active persons (e.g., user accounts) on the network (e.g., Tumblr users or user accounts that initiate a blog post).

An action can be executed 318 by the system based on knowledge of the source agents and/or the network that the source agents influence. For example, specific advertisements, offers, marketing messages, news, or other information can be directed to the source agents, such as directing marketing information (ads. Etc.) to be displayed on social media account associated with the influential source agent. This can be performed, for example, by activating pre-classified advertisements and causing or otherwise directing those advertisements to be displayed on the relevant social media account when viewed by the source agent. This may facilitate the spread of such advertisements, news, or other information, which may include discounts, sales, or gifts. In another aspect, the source agent's network account can be disconnected, deactivated, or terminated. In another aspect, the identity of the source agents is provided via a display, website, social media account, a message from a server to a client, and/or one or more messages sent via text message or email to a recipient or interested part.

Separately, sparse encoding 314 can be performed based on the results of dictionary learning 308 to categorize the dynamics of the network (dynamics categorization 316).

Dynamics categorization 316 provides identification of different types of dynamic processes unfolding on networks. Further details regarding these processes are described below.

(4.1) NMF-Based Analysis (4.1.1) Setup

A starting point for the system, in terms of representing the signals (i.e., Tumblr reblog activities), is to consider graph attributes as a vector: A graph comprises a set of nodes N and edges E. Assuming there are real-valued attributes (they could belong to any set, but for illustrative purposes they are described as the set of reals), then the attributes can be thought of as the result of a function a that maps nodes to reals as in, a:N→R. For example, a can represent some aspect of people's activity in a social network, and in this case, a:N→{0} ∪R. Denoting label a ($v_i$) as the attribute corresponding to node i, the attribute vector x is then defined as, $$x=[a(n_1),a(n_2),\ldots,a(n_N)]^T \quad (1)$$

where the $i^{th}$ entry of the attribute vector corresponds to the attribute of node i. The ordering of the nodes is arbitrary, but it must remain consistent.

By extension, if the attributes at a given node are a time series, the attribute vectors at each time step can be packed into a matrix of attributes X (attribute matrix) that is N by t dimensional, where t is the number of time steps in the signal (note: the signal is represented with graph attributes).

(4.1.2) The NMF Step

The approach of this disclosure is to learn the basis vectors for the transform from the graph attributes using dictionary learning (dictionary learning is described, for example, in Literature Reference No. 12). Specifically, the system uses non-negative matrix factorization (NMF) to understand the time series of attributes, because the attribute matrix X defined above has non-negative entries, and the NMF results are straightforward to interpret.

NMF is an algorithm for approximating a matrix with non-negative entries as the product of two matrices, also with non-negative entries, so that each column of the input matrix can be represented as a linear combination of a set of dictionary atoms. The first matrix of the two matrices reveals the coefficients. The second matrix is the discovered set of dictionary atoms (each atom is a column vector). In other words, given an input matrix X with entries $x_{ij} \geq 0$, NMF solves the following optimization problem:

$$\min_{W,H} \|X - WH\|_F^2, \quad (2)$$

subject to $w_{ij} \geq 0$, $h_{ij} \geq 0$ for all i and j, where W is an N by k (a number of components set for NMF) matrix and H is k by t.

NMF can be considered as a transform where the matrix H corresponds to the coefficients and W contains the basis functions. Using the terminology of dictionary learning, W is referred to as the dictionary, and its column-vectors the dictionary atoms.

This algorithm is useful for dimensionality reduction (where k<t) (see Literature Reference No. 7 for a description of dimensionality reduction), or for sparse encoding (k>t) (see Literature Reference No. 6 for a description of sparse encoding); both of which are helpful for purposes of the system described herein. Dimensionality reduction will serve to identify the different sources, or starting points, for dynamic process on networks. In other words, dimensionality reduction is performed on the input matrix X with a predefined k (the number of basis functions) that is smaller than t (the number of time steps in the signal), followed by computing the influence score (described below) according to NMF to identify the influential source agents.

Sparse encoding is performed on the input matrix X with a predefined k that is larger than t, followed by analyzing the NMF basis functions to help in understanding the nature of the processes unfolding on the network through dynamics categorization (i.e., determine whether the dynamics follow the Independent Cascade Model, Linear Threshold Model, or other models). Dynamics categorization refers to identifying the types of dynamics that is unfolding on the networks.

The NMF atoms provide an insightful way of summarizing the input signal. Given a large input matrix, with many time steps, the NMF atoms will find the recurrent patterns and important information relevant to reconstructing the signal from a small number of coefficients.

NMF was chosen over other dictionary learning methods, such as online dictionary learning (ODL) (see Literature Reference No. 8), because it is straightforward to interpret its positive entries; however, ODL might be more useful for problems where the attributes can be negative. For example, competing opinions on a social network could result in positive and negative attribute values representing people's choice of opinions.

(4.1.3) NMF for Huge Data

If the system is processing an extremely large data set, with at least tens of thousands of nodes, the computational complexity of the approach becomes problematic; however, if the nodes can be split into communities where there is little intercommunication, the algorithm can be run in parallel and drastically reduce run time.

The attribute matrix throws away the information about the underlying connections between nodes (therefore, the attribute matrix does not contain information about the graph structure). The dimension of the attribute matrix is the number of nodes by the number of timestamps. The modified approach applies dictionary learning to submatrices of the attribute matrix (determined by finding subgraphs using community detection), instead of applying dictionary learning to the full attribute matrix. This way, the modified approach is more scalable. The modified approach that makes dictionary learning more efficient to run in parallel (this especially benefits large datasets) by dividing the graph into a set of subgraphs using community detection. For each subgraph, the dictionary learning is performed, in which the learned atoms are used for initialization of the dictionary learning algorithm of the entire graph, with additional global-scale atoms.

Given a graph G of nodes N and edges E, the graph can be divided into a set of subgraphs $L=\{G_0, G_1, G_2, \ldots\}$. For each subgraph, the system performs the analysis described above. That is, for subgraph $G_0$, the system generates a signal matrix $X_0$, which is used for NMF, resulting in a coefficients matrix $H_0$ and a dictionary atoms matrix $W_0$.

For clarity, and without loss of generality, it is assumed that the nodes of G are numbered such that the nodes also in $G_0$ start at zero and end at $N_0$, while the nodes also in $G_1$ start from $N_0$ and end at $N_0+N_1$, and so on. Using the full matrix, the system initializes the dictionary learning algorithm with the following dictionary matrix:

$$W = \begin{bmatrix} | & | & & W_0 & 0 & 0 & \\ | & | & & 0 & W_0 & 0 & \\ r^T & r^T & \cdots & 0 & 0 & W_0 & \cdots \\ | & | & & 0 & 0 & 0 & \\ \underbrace{| \quad |}_{k} & & & 0 & 0 & 0 & \end{bmatrix} \qquad (5)$$

where k is a number of global-scale atoms that are sought to be determined, and r is row-vector with entries taken at random or following an NMF Initialization step.

Instead of optimizing the entire W matrix, however, only the first k columns are updated. This means that the system is learning k new global-scale atoms, and keeping the local atoms intact. Since NMF updates the dictionary matrix column by column, it is straightforward to make this adaptation (see Literature Reference No. 7 for a discussion of matrix factorization). The reason why this works is because there is little information traveling between network communities. If the community atoms capture dynamics well at their local scale, then only a limited number of global atoms are needed to represent the data.

(4.2) Social Media Data Simulations

To demonstrate the effectiveness of the system described herein, new simulations were devised to better reflect the type of data that comes from social media websites.

(4.2.1) The Decaying Cascade Model

The decaying cascade model generates data e.g., activities (signals), that reflect data from social media and provide ground truth (influential nodes or users, i.e., initial nodes that drive widespread changes of state) for evaluation of the system. In the decaying cascade model, a set of initially active people (nodes) try to spread an opinion on a network. People's opinions can be tracked as an ordered sequence of events E. This sequence starts with the initially active users becoming active at time zero. The following section will explain how to go from the sequence of events to network attributes; however, the remainder of this section focuses on the dynamics simulation.

After a random amount of time, an active person picked at random (this person is referred to as the source) tries to convince one of her neighbors on the network (referred to as the target) to adopt her opinion. There is a probability $p_0$ that the source will succeed, in which case an event is added to the sequence, recording that the target adopted the opinion at some time t. In the event of failure, the source may no longer attempt to convince the target.

This process is repeated until the end of the simulation at a specified time T. After a random amount of time, a new random source is picked (this includes all the successfully convinced targets) who will attempt to convince one of his neighbors (also picked at random). The probability of success, however, depends on the target's distance to one of the initially active persons in the network. This is determined by:

$$p(n) = p_0 \exp(-d_{V_0}(n)) \qquad (3)$$

were n is the targeted person, $d_{V_0}(n)$ is the shortest path distance on the network from the target to one of the initially active persons $V_0$.

The decaying cascade model is an adaptation of the independent cascade model meant to reflect the fact that ideas tend to have limited reach in most practical situations (i.e., "Your friend's friend is usually less likely to adopt your opinions than your friend"). The Decaying Cascade Algorithm is as follows:

```
1:   procedure DECAYING CASCADE
2:       Set t = 0
3:       Pick V_0 from N
4:       Initialize list V = V_0
5:       Set E = {(t, n) : n ∈ V_0}
6:       while t < T do
7:           t += Random increment
8:           Randomly pick n_Source ∈ V
9:           Randomly pick n_Target ∈ Neighbors of r_Source
10:          Pick outcome with probability p (n_Target)
11:          if Source convinces target then
12:              V = V ∪ n_Target
13:              E = E ∪ (t, n_Target)
14:          else
15:              n_Source gives up on n_Target forever
16:          end if
17:      end while
18:  end procedure
```

(4.2.2) Building a Signal from the Events

Given the sequence of events from one of the above two simulations, a time resolution is set for signal (or a sampling rate) $t_S$. The signal output is an N by $T/t_S$ matrix X, where N is the number of nodes in the social network, and T was the simulation run time.

Entry $(X)_{ij}$ is equal to one if node i was convinced to adopt the opinion in the time interval $[j \cdot t_S, (j+1) \cdot t_S]$; otherwise the entry is zero. Note that the column vector $(X)_{-0}$, provides:

$$(X)_{i0} = \begin{cases} 1, & \text{if } n_i \in V_0, \\ 0, & \text{otherwise.} \end{cases} \qquad (4)$$

where $V_0$ is the set of initially active persons. The signal X is an attribute matrix as described above in the Setup section.

(4.3) Example Reduction to Practice (4.3.1) Influence Maximization

Figure 4:
FIG. 4 is a table summarizing example results from using the system of the present disclosure.

Without making any assumptions, the method of this disclosure finds, with high accuracy, the influential users (influential sources). For example, the influence score in the following is defined to find influential nodes (and then evaluate against ground truth source nodes). From the NMF atoms, the first the top k (e.g., 20) atoms are found according to their coefficient magnitudes, with a weighted sum of these atoms then being computed. The influence score at each node is the average value of its neighboring nodes in the weighted sum atom. FIG. 4 for example is a table 400 depicting accuracy measures for the NMF-based influence maximization process. Using two models to generate data with ground truth source nodes, the relative number of correctly identified sources is compared with the relative number of sources identified within a one-edge hop distance.

More specifically, the table summarizes the results of the following experiment: On a graph with two hundred nodes, the threshold and decaying cascade dynamics were run (one for each experiment) with 10 initially active nodes to generate a signal that is for the method. The nodes were ranked in terms of importance using the influence attributes. Of the top 10 nodes, if the nodes match one of the influential nodes set in the simulation, that is counted towards the "exact node" accuracy; if it is within one hop of one of an initial node not previously matched, that is counted towards "within one hop" accuracy.

Figure 5:
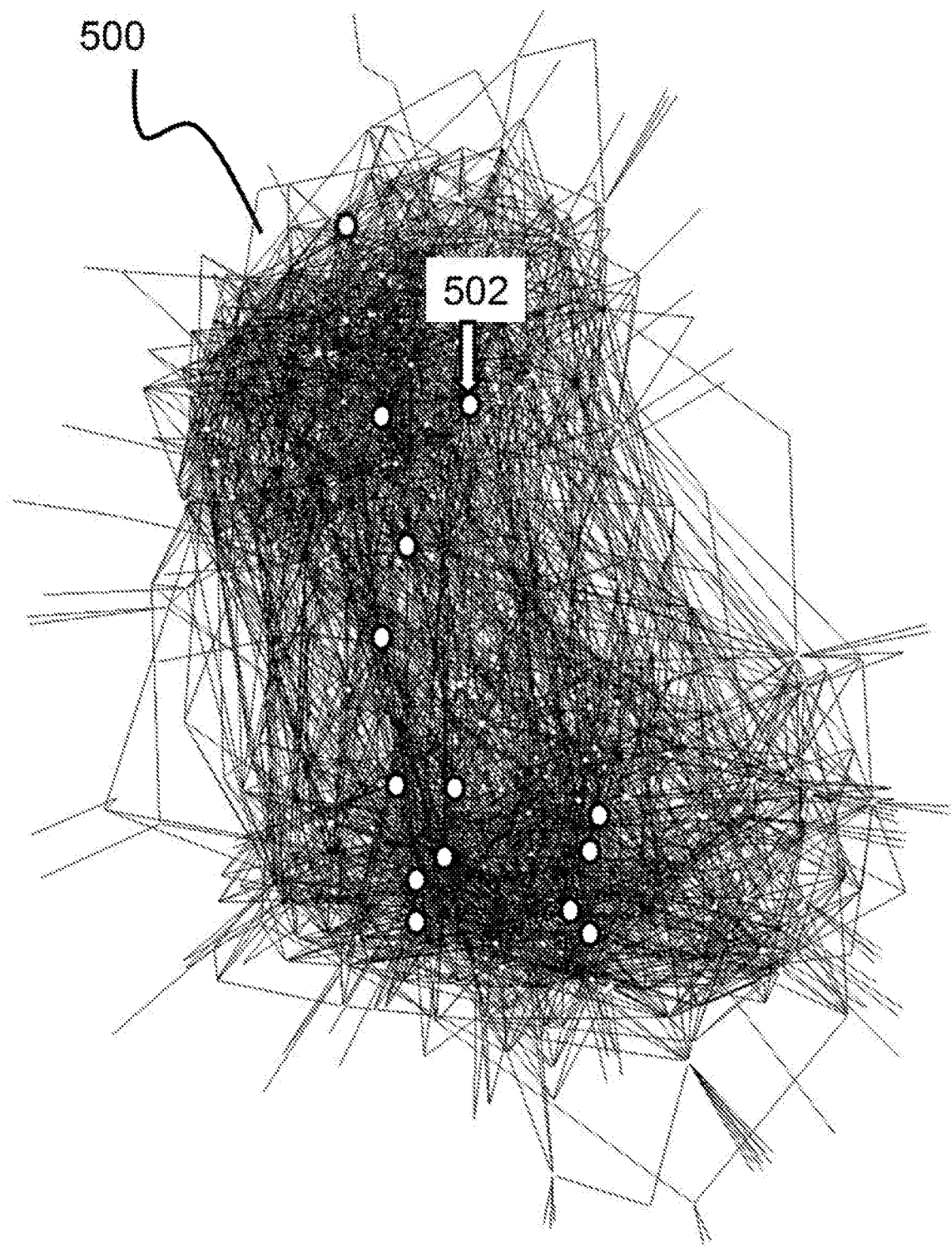
FIG. 5 is a network graph, illustrating users of an online social platform and their relative levels of influence.

FIG. 5 demonstrates the method on real data gathered from 513 Tumblr users, depicting a graph 500 of the users. The white circular nodes 502 are the ones considered more influential.

(4.4) Network Process Example

For further understanding, FIGS. 6A through 6D depict how the dictionary atoms from two different simulated processes distinguish the two different ways in which information is spreading on a graph. Specifically, FIGS. 6A and 6B depicting atoms spreading a threshold model, while FIGS. 6C and 6D depict atoms spreading in a cascade model. FIGS. 6A and 6B depict several dark nodes 600 (influential users) in the network graph 602, while FIGS. 6C and 6D each only depict one dark node 600 (influential user) per network graph 602. This is because information is spreading differently in the cascade and threshold models. Thus, given this disclosure, it is clear that the system can find sources of dynamic change in a network without making any assumptions about the underlying dynamic processes. The system can identify and help understand the different processes by which changes occur over a network.

(4.5) Example Implementation

For further understanding, provided below is a non-limiting example of a specific implementation using the system as described herein. For example, the system receives Tumblr data (e.g., where users write or respond to short blog posts). The NMF approach is used to find influential users on Tumblr and better understand how people's ideas spread on this social network.

For this analysis, the reblog network can be used as the underlying graph structure. Users are a node, and directed edges correspond to users who rebloged each other's content. In other words, if user i reblogs user j's posted content, there is a directed edge from i to j in the reblog network The method was demonstrated on a group of 59,709 users, which were picked using a community detection method. First, the reblog network was built for the entire dataset. Then, the system finds the largest connected component (e.g., approximately six million users). Finally, Louvain components were used to find a community of users with a large-enough number of node. After selecting the users, an attribute matrix was built according to their activity on Tumblr for a year. The sampling rate in this example was twelve hours.

Using the parallelism method, the graph of 59,709 users was petitioned into two subcomponents, with NMF being set up to learn 200 atoms for each subcomponent over 100 iterations. After combining the two dictionaries, an additional 200 atoms over 100 iterations were learned.

As shown in FIG. 7, after ranking users according to the influential scores, it was determined that the most influential blogs according to the method mostly revolve around humor and fashion.

After performing the process described above to identify an influential blog user or user account (i.e., agent), an action can be executed (as shown in FIG. 3, element 318) by the system based on knowledge of the influential blog users. For example, specific advertisements, news, or other information can be directed to the influential blog users or user accounts (of social networks, etc.) so that the information can be more widely and rapidly disseminated. In another aspect, the influential blog user's account can be disconnected or terminated.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for inferring network dynamics and their sources within a network, the system comprising:
one or more processors and a memory, the memory being a non-transitory computer-readable medium having executable instructions encoded thereon, such that upon execution of the instructions, the one or more processors perform operations of:
generating a vector representation based on states of agents in a network, the vector representation including attribute vectors that correspond to the states of the agents in the network;
generating an attribute matrix based on the changing states of agents by packing the attribute vectors at each time step into the attribute matrix;
learning time-evolving states of agents using dictionary learning, wherein learning time-evolving states of agents using dictionary learning is performed through non-negative matrix factorization (NMF);
identifying influential source agents in the network by performing dimensionality reduction on the attribute matrix; and
executing an action based on the identity of the influential source agents.

2. The system as set forth in claim 1, wherein in generating a vector representation based on the states of agents in a network, the network includes nodes and edges connecting the nodes, the nodes representing agents in the network and the edges representing actions by the agents in the network.

3. The system as set forth in claim 1, wherein if the attributes at a given node are a time series, attribute vectors at each time step can be packed into a matrix of attributes X that is N by t dimensional, where t is the number of time steps in a signal and N is a number of nodes in the network.

4. The system as set forth in claim 1, wherein the changing states of agents is based on a time-series of each agent.

5. The system as set forth in claim 1, wherein learning the time-evolving states of agents using dictionary learning is performed using the attribute matrix.

6. The system as set forth in claim 1, wherein learning the time-evolving states of agents using dictionary learning is performed in parallel using submatrices of the attribute matrix.

7. The system as set forth in claim 1, further comprising an operation of acquiring data from a social network server that includes states of agents in a network.

8. The system as set forth in claim 1, wherein executing an action further comprises an operation of directing marketing information to be displayed on a social media account associated with the influential source agents.

9. The system as set forth in claim 1, wherein executing an action further comprises an operation of providing the identity of the influential source agents via a display.

10. The system as set forth in claim 1, wherein executing an action further comprises an operation of deactivating a social media account associated with the influential source agents.

11. The system as set forth in claim 1, wherein the vector representation is generated by converting a graph representation that includes agents, connections between agents, and states of agents.

12. A computer program product for inferring network dynamics and their sources within a network, the computer program product comprising:
a non-transitory computer-readable medium having executable instructions encoded thereon, such that upon execution of the instructions by one or more processors, the one or more processors perform operations of:
generating a vector representation based on states of agents in a network, the vector representation including attribute vectors that correspond to the states of the agents in the network;
generating an attribute matrix based on the changing states of agents by packing the attribute vectors at each time step into the attribute matrix;
learning time-evolving states of agents using dictionary learning, wherein learning time-evolving states of agents using dictionary learning is performed through non-negative matrix factorization (NMF);
identifying influential source agents in the network by performing dimensionality reduction on the attribute matrix; and
executing an action based on the identity of the influential source agents.

13. The computer program product as set forth in claim 12, wherein in generating a vector representation based on the states of agents in a network, the network includes nodes and edges connecting the nodes, the nodes representing agents in the network and the edges representing actions by the agents in the network.

14. The computer program product as set forth in claim 12, wherein if the attributes at a given node are a time series, attribute vectors at each time step can be packed into a matrix of attributes X that is N by t dimensional, where t is the number of time steps in a signal and N is a number of nodes in the network.

15. The computer program product as set forth in claim 12, wherein the changing states of agents is based on a time-series of each agent.

16. The computer program product as set forth in claim 12, wherein learning the time-evolving states of agents using dictionary learning is performed using the attribute matrix.

17. The computer program product as set forth in claim 12, wherein learning the time-evolving states of agents using dictionary learning is performed in parallel using submatrices of the attribute matrix.

18. A computer implemented method for inferring network dynamics and their sources within a network, the method comprising an act of:
causing one or more processors to execute instructions encoded on a non-transitory computer-readable medium, such that upon execution, the one or more processors perform operations of:
generating a vector representation based on states of agents in a network, the vector representation including attribute vectors that correspond to the states of the agents in the network;
generating an attribute matrix based on the changing states of agents by packing the attribute vectors at each time step into the attribute matrix;
learning time-evolving states of agents using dictionary learning, wherein learning time-evolving states of agents using dictionary learning is performed through non-negative matrix factorization (NMF);
identifying influential source agents in the network by performing dimensionality reduction on the attribute matrix; and
executing an action based on the identity of the influential source agents.

19. The computer implemented method as set forth in claim 18, wherein in generating a vector representation based on the states of agents in a network, the network includes nodes and edges connecting the nodes, the nodes representing agents in the network and the edges representing actions by the agents in the network.

20. The computer implemented method as set forth in claim 18, wherein if the attributes at a given node are a time series, attribute vectors at each time step can be packed into a matrix of attributes X that is N by t dimensional, where t is the number of time steps in a signal and N is a number of nodes in the network.

21. The computer implemented method as set forth in claim 18, wherein the changing states of agents is based on a time-series of each agent.

22. The computer implemented method as set forth in claim 18, wherein learning the time-evolving states of agents using dictionary learning is performed using the attribute matrix.

23. The computer implemented method as set forth in claim 18, wherein learning the time-evolving states of agents using dictionary learning is performed in parallel using submatrices of the attribute matrix.

* * * * *